May 22, 1945. G. H. STROBEN Re. 22,644
CONCRETE FORM CLAMP
Original Filed Jan. 9, 1943
Fig. 1
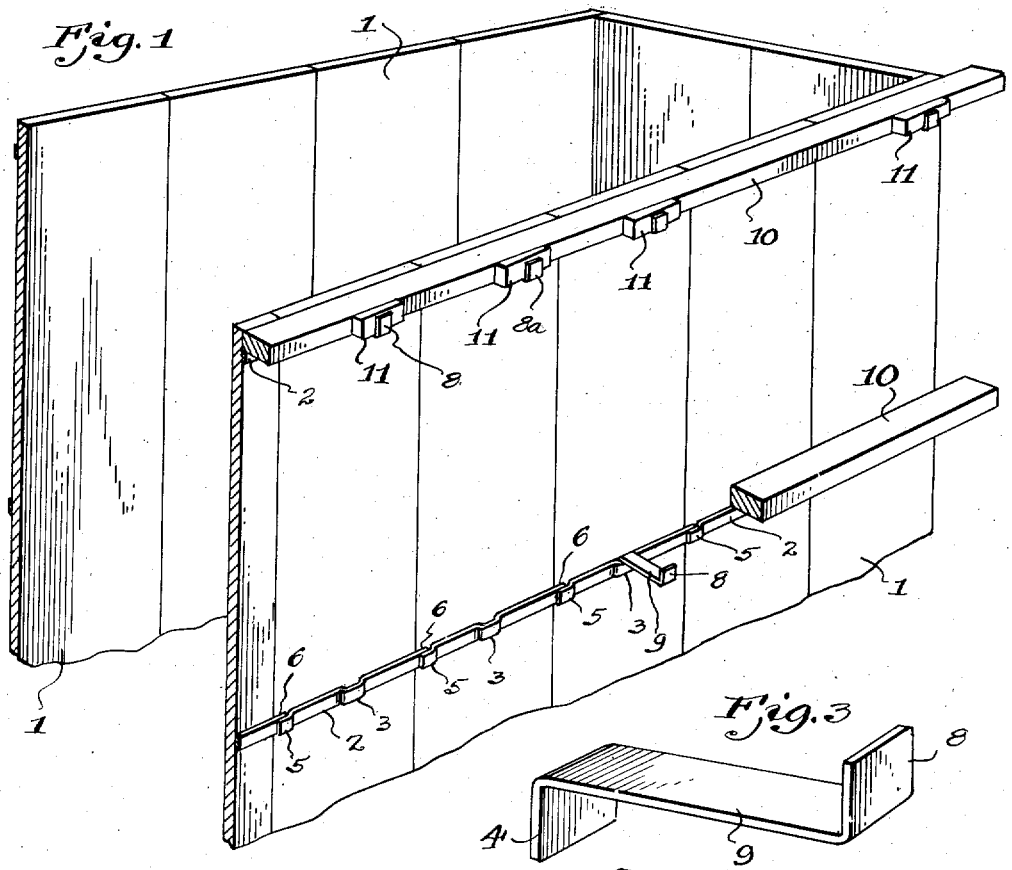
Fig. 3
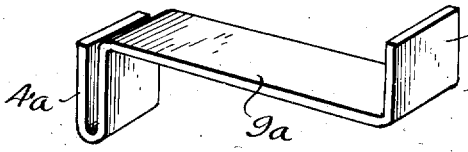
Fig. 4
Fig. 2
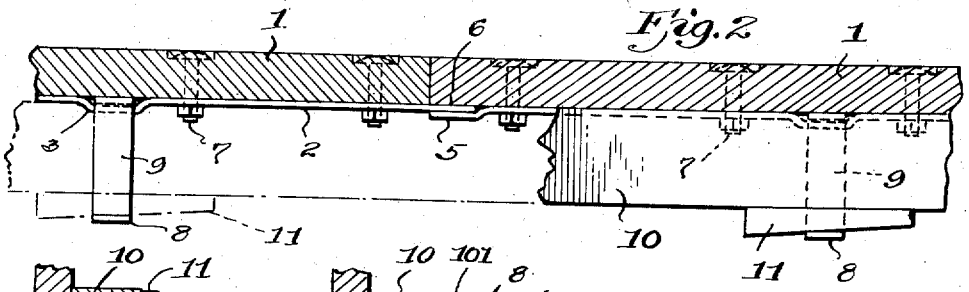
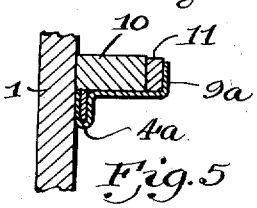
Fig. 5
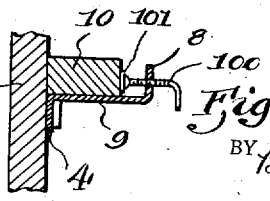
Fig. 6
INVENTOR.
George H. Stroben
BY Barnes, Kisselle, Laughlin & Raisch
Attorneys.

Reissued May 22, 1945

Re. 22,644

UNITED STATES PATENT OFFICE 22,644

CONCRETE FORM CLAMP

George H. Stroben, Detroit, Mich.

Original No. 2,340,439, dated February 1, 1944, Serial No. 471,857, January 9, 1943. Application for reissue January 31, 1945, Serial No. 575,427

13 Claims. (Cl. 25—131)

This invention relates to clamping means for concrete forms.

All sorts of clamps have been proposed and used for clamping the planks or boards together for the concrete form into which the pour is made for constructing concrete walls for buildings, fortifications and all kinds of monolithic structures. It is the object of the present invention to provide a clamping system which involves simplicity, economy and facility in putting the same together. This system is particularly effective as means is also afforded for providing additional clamping means for tightening or straightening portions of the concrete form in case the normal clamping means has left portions of the concrete form out of the desired position. This will be more fully explained in the detailed specification following.

Referring to the drawing:

Fig. 1 is a fragmentary sectional perspective of a concrete form.

Fig. 2 is a horizontal cross section of the same.

Fig. 3 is a perspective of one of the movable clamping brackets—the normal type.

Fig. 4 is a perspective of one of the supplementary clamping brackets which is used to tighten portions of the concrete form requiring this.

Fig. 5 is a vertical cross section through a portion of the concrete form where one of these last mentioned clamps is used.

Fig. 6 is a vertical section of a modification embodying a bolt for tightening in place of a wedge for a fastening device.

The concrete form is built up of boards or planks 1 which ordinarily will be vertically arranged but, of course, could be laid horizontally. Bolted to these planks is a plurality of metal straps 2. These straps may be bolted to the outside of the planks at the top, bottom and mid portions or at any other desirable location on the plank. Each strap has a center portion bumped out as at 3 to form a recess or socket to receive the tongue of the angle arm bracket designated 4. One end of the strap is offset outwardly as at 5; the other end 6 of the strap projects outwardly to form a tenon which fits into the tenon groove formed by the offset portion 5. The bolts are shown at 7 in Fig. 2.

The problem is how to tie, support and clamp the timbers in place that support the planks in a concrete form. This I accomplish by bolting these simple straps on each of the planks. These straps with their ends formed into a tenon and a tenon groove arrangement effectively line the planks up in the desired plane. Each strap member has a tongue-receiving socket 3. Ordinarily it will not be necessary to use a clamp on each plank because the tenon and tenon groove arrangement of the straps holds the planks in line and it is only necessary to tie the planks and the timbers together every third or fourth plank. Hence, one of the brackets will be dropped into the tongue socket, as shown in Fig. 1. This angle arm bracket has a tongue portion 4 at one end and a turned-up portion 8 at the other end, which I shall designate the turned-up lug. The web 9 rests in horizontal position when the bracket is in place. As will readily be seen from Fig. 1, the horizontal beam or timber 10 can be dropped on these removable brackets. Then the wedges 11 may be driven in place between the vertical lug and abutment 8 and the outside face of the timber or beam. This tightly draws the plank to which the strap is attached against the beam and the strap and the plank together draw the adjoining planks toward the beam.

As already explained, it will not be necessary to use the brackets except every three or four planks. However, for clearness of showing I have shown the straps located on every other plank at the top of Fig. 1. It may be found, however, that after the normal clamps have been tightened, one or more of the boards are still out of line or out of plane or loose. To meet this situation I use another form of bracket shown in Fig. 4. Here the angle arm bracket is formed just as the normal bracket but it has a loop form of tongue at the socket and designated 4*a*. This tongue may be slipped in the tongue socket 3 from beneath and, consequently, can be mounted on the job after the timber has been set in place and tightened. This form of bracket, of course, is of no value to hold the timber in place initially because it would drop out of the socket, but after the timber or beam has been set and clamped in place, if any part of the structure is out of true this clamp can be readily slipped in place and a wedge driven in to tighten the structure adjacent that particular plank. Such a clamp is shown in place at 8*a* in Fig. 1. The reference characters 4*a*, 9*a* and 8*a* are used on this type bracket to designate, respectively, the tongue, the web and the turned-up lug of the clamp.

It will be seen from this description that this clamping arrangement is extremely simple. The straps attached to the boards or planks do not project any considerable distance above the surface of the plank and, consequently, the planks can easily be stacked when not in use. The boards may be set up and matched together with a minimum of trouble. Then the simple angle iron clamps may be dropped in place, the timbers set and then wedged into place simply by driving wedges which can be made of wood or metal, as desired. Then if it is found that any of the structure is out of line or out of true, all that is necessary is to place the supplemental angle arm brackets in place from below the timbers and drive the wedges home.

In Fig. 6 I have shown a modified form wherein a bolt 100 is substituted for the wedge. On the other end of this bolt is a swivelled plate 101 which communicates the thrust of the bolt to the timber.

What I claim is:

1. Clamping and aligning means for concrete forms made up of planks, cross beams or timbers comprising, a plurality of straps, each strap arranged to be set across a plank, the ends of the straps arranged to match together in interlocking position and Z-shaped brackets interlocking with the strap for supporting a beam or timber and provided with means for tying the beam or timber to the plank.

2. Clamping and aligning means for concrete forms made up of planks, cross beams or timber comprising, a plurality of straps, each strap arranged to be set across a plank, the ends of the straps arranged to match together in interlocking position and means interlocking with the strap for supporting a beam or timber and tying the beam or timber to the plank comprising removable stamped metal Z-shaped brackets removably interlocking with the straps and wedge driven between the brackets and the timber.

3. Clamping and aligning means for concrete forms made up of planks and cross beams or timber comprising, a plurality of straps, each strap arranged to be set across a plank, the ends of the straps arranged to match together in interlocking position and means interlocking with the strap for supporting a beam or timber and tying the beam or timber to the plank comprising angle arm brackets having each a turned-down tongue arranged to removably interlock with a strap on the plank and a turned-up lug at the opposite end of the bracket with an interconnecting web portion arranged to support the timber or beam and a fastening member in between the timber and the turned-up lug.

4. Clamping and aligning means for concrete forms made up of planks and cross beams or timbers comprising, a plurality of straps, each strap provided with a bumped-out center portion forming a tongue socket and arranged to be set across a plank, the ends of the straps arranged to match together in interlocking position and means interlocking with the straps for supporting a beam or timber and tying the beam or timber to the plank comprising removable angle brackets each having at one end a turned-down tongue adapted to be slipped into said tongue socket of a strap, a turned-up outer end forming an upstanding lug and a fastening member arranged to be driven in between the outside face of the timber and the lug to tie the the structure together.

5. Clamping and aligning means for concrete forms made up of planks and cross beams or timbers comprising a plurality of straps, each strap provided with a bumped-out center portion forming a tongue socket and arranged to be set across a plank, means interlocking with the strap for supporting a beam or timber and tying the beam or timber to the plank comprising removable brackets each having at one end a turned-down tongue adapted to be slipped into said tongue socket of a strap, a turned-up outer end forming an upstanding lug and a fastening member arranged to be driven in between the outside face of the timber and the lug to tie the structure together.

6. Clamping and aligning means for concrete forms made up of planks and cross beams or timbers comprising, a plurality of straps, each strap provided with a bumped-out center portion forming a tongue socket and arranged to be set across a plank, means interlocking with the strap for supporting a beam or timber and tying the beam or timber to the plank comprising removable brackets each having at one end a turned-down tongue adapted to be slipped into said tongue socket of a strap, a turned-up outer end forming an upstanding lug, a wedge that can be driven in between the outside face of the timber and the lug to tie the structure together, a supplemental bracket having at one end an upturned lug and at the other end a loop-like tongue member, the said supplemental bracket arranged to be slipped in place on the under side of the beam after the beam has been set and tightened for the purpose of correcting irregularities in the form, together with a fastening member arranged for driving in between the upturned lug of the supplemental bracket and the beam.

7. Clamping and aligning means for concrete forms made up of planks and cross beams or timbers comprising a plurality of straps, each strap provided with a bumped-out center portion forming a tongue socket and arranged to be set across a plank, means interlocking with the strap for supporting a beam or timber and tying the beam or timber to the plank comprising removable brackets each having at one end a turned-down tongue adapted to be slipped into said tongue socket of a strap, a turned-up outer end forming an upstanding lug and a fastening member between the outside face of the timber and the lug to tie the structure together.

8. Clamping and aligning means for concrete forms made up of planks and cross-beams comprising a plurality of straps, each strap provided with an offset portion forming a tongue socket and arranged to be secured to the outside of a plank and means interlocking with the strap for clamping the beam to the plank comprising removable brackets each having at one end a tongue in the form of an angle arm arranged to be slipped into said tongue socket of the strap and having at the other end an abutment and a wedge arranged to be driven in between the outer face of the timber and the abutment on the bracket to clamp the beam to the planks.

9. Clamping and aligning means for concrete forms made up of planks and cross-beams comprising a plurality of straps, each strap provided with an offset portion forming a tongue socket and arranged to be secured to the outside of a plank and means interlocking with the straps for clamping the beam to the plank comprising removable brackets each comprising a sheet metal strap at one end having a tongue in the form of an angle arm arranged to be removably hooked into the tongue socket and having the other end provided with means forming an abutment spaced from the plane of the outer face of the beam and a removable wedge arranged to be driven in between the outer face of the beam and each abutment to clamp the beam and planks together.

10. Clamping and aligning means for concrete forms made up of planks and cross-beams comprising a plurality of straps, each strap provided with an offset portion forming a tongue socket and arranged to be secured to the outside of a plank and means interlocking with the straps for clamping the beam to the plank comprising removable brackets each having at one end a tongue in the form of an angle arm arranged to be slipped into said tongue socket of the strap and having at the other end an abutment and a clamping member arranged to be engaged between the face of the beam and each abutment to clamp the beam and planks together.

11. Clamping and aligning means for concrete forms made up of planks and cross-beams comprising a plurality of straps, each strap provided with an offset portion forming a tongue socket and arranged to be secured to the outside of a plank and means interlocking with the straps for clamping the beam to the plank comprising removable brackets each comprising a sheet metal strip at one end having a tongue in the form of an angle arm arranged to be removably hooked into the tongue socket and having the other end provided with means forming an abutment spaced from the plane of the outer face of the beam and a clamping member arranged to be engaged between the face of the beam and each abutment to clamp the beam and planks together.

12. A clamp for concrete forms made up of planks and cross beams, comprising a socket member for securing to the outside face of a plank, a bracket having an angular portion adapted to hook into the socket and having at its outer end an abutment arranged to be spaced from the outer face of the beam and a wedge arranged to be driven in between the abutment and the outer face of the beam.

13. A clamp for concrete forms made up of planks and cross beams, comprising a socket member for securing to the outside face of a plank, a bracket having on angular portion arranged to hook into the socket and having at its outer end an abutment arranged to be spaced from the outer face of the beam and a spreading member arranged to engage between the abutment and the outer face of the beam.

GEORGE H. STROBEN.